March 22, 1966  H. R. A. HANSEN  3,242,407
DUAL GAIN INPUT CIRCUIT FOR GENERATOR-FED MOTOR CONTROL SYSTEM
Filed Jan. 14, 1963
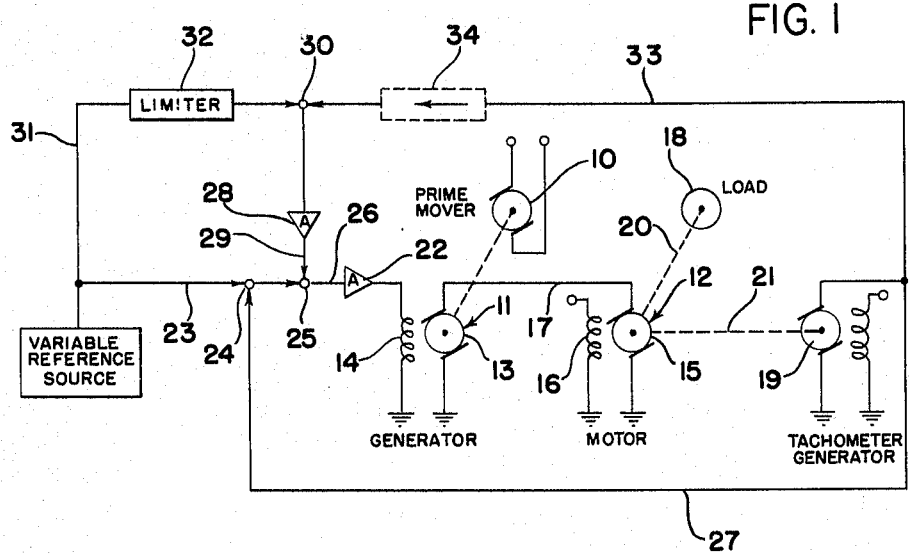
FIG. 1
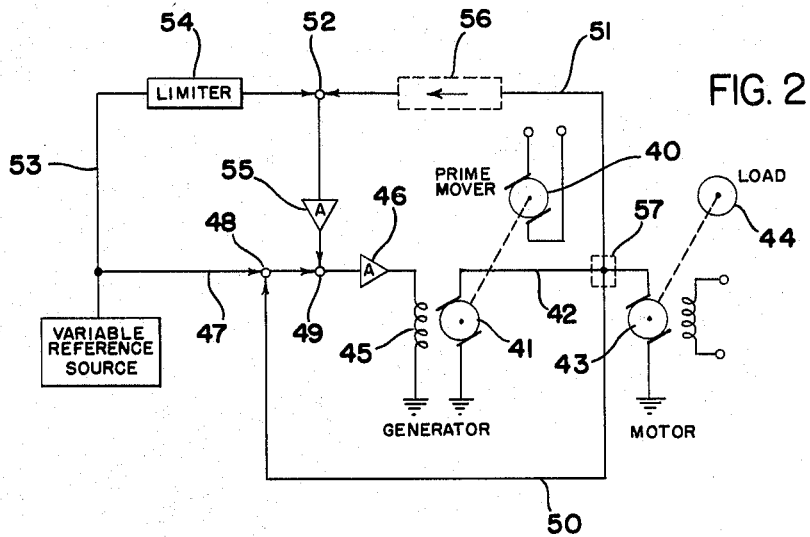
FIG. 2
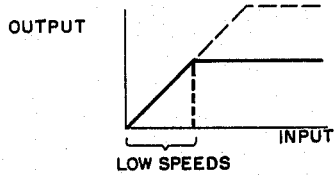
FIG. 4
FIG. 3
INVENTOR.
HANS RICHARD ANSGAR HANSEN
BY
*Fay & Fay*
ATTORNEYS United States Patent Office 3,242,407
Patented Mar. 22, 1966

3,242,407
DUAL GAIN INPUT CIRCUIT FOR GENERATOR-FED MOTOR CONTROL SYSTEM
Hans Richard Ansgar Hansen, Akron, Ohio, assignor to The Imperial Electric Company, Akron, Ohio, a corporation of Ohio
Filed Jan. 14, 1963, Ser. No. 251,108
8 Claims. (Cl. 318—143)

This invention relates to a direct current adjustable speed drive system, and more particularly to an adjustable control system for effecting excellent regulation over a wide range of speeds.

The many advantages of an adjustable voltage control system account for its widespread use in industrial applications. One of the most basic and important advantages is the amount of speed reduction that can be obtained below the base speed of the motor being controlled. The operating characteristics of an adjustable voltage control system are generally good and the available speed control is adequate for certain applications, thereby making it possible to select and retain speeds even though the load requirements of the connecting machinery vary. The wide speed range is obtained merely by changing the field excitation of the generator through suitable means, such as a regulator.

Basically, a regulator is a device which compares a command signal (reference) with a controlled variable signal (feedback). Any difference in these two signals causes the regulator output to change. Correspondingly, the controlled equipment changes its operation until the feedback signal is substantially in balance or properly compared with the reference signal.

One of the most frequently used systems for variable speed drives is the Ward-Leonard system. Where a wide speed range is required, for example, 1–10, in the past it has been necessary to provide a regulator which had a sufficiently high gain at low speeds to perform the regulating function and, accordingly, gain at high speeds was beyond that necessary for effective regulation. However, where the speed range will vary, for example, from 1 to 100 or 200, this practice has not proved to be feasible.

The present invention contemplates solution of the above problem through the use of dual amplifiers with only one being active at high speeds. As is well known, excellent regulation can be had with a constant gain at the higher speeds; however, in the lower speed ranges, high gain is requisite for good control. In the present system, the second amplifier automatically becomes operative to provide a two-stage amplification system insuring sufficient gain to secure excellent regulation in the lower speed ranges.

Therefore, it is a principal object of this invention to provide a speed regulation system which will have high gain without providing excessive gain at high speeds, thereby insuring good regulation over a wide range of speeds.

It is a further object of this invention to provide a regulation system which has a reduced number of components and therefore is simple and economical to manufacture.

It is a further object of this invention to provide a variable gain speed regulation system which will have dual stage amplification at low speeds and single stage amplification at high speeds.

It is a further object of this invention to provide an adjustable speed drive system wherein dual feedback is employed to control effectively the magnitude of the resultant power supplied to the input of the control amplifiers.

It is a further object of this invention to provide alternate means of providing feedback to modify the command signals to each of the control amplifiers.

Further and fuller objects will become readily apparent when reference is made to the following specification and accompanying drawings, in which:

FIG. 1 is a schematic representation of a variable speed drive arrangement in accordance with the invention;

FIG. 2 is a schematic representation of an alternate variable speed drive arrangement in accordance with the invention;

FIG. 3 is a graph illustrating the operational characteristics of one of the control amplifiers; and FIG. 4 is a graphical representation of output v. input in the second control amplifier input circuit, with limiters in the reference and feedback circuits.

Referring now to FIG. 1, a schematic representation of a preferred drive arrangement in accordance with the invention is shown. In the arrangement there is included a generator motor set of the Ward-Leonard type, including a prime mover 10, D.-C. generator 11 and D.-C. motor 12. The generator 11 has an armature 13 and field winding 14. Similarly, the motor 12 is provided with an armature 15 and field winding 16, the latter being connected to a suitable power source. The prime mover 10 drives the generator 11 at substantially constant speed to generate power, with the output being supplied from the generator armature 13 to the armature 15 of the motor via conductors represented by line 17. The controlled motor 12 drives a load 18, as well as a tachometer generator 19 through suitable connections indicated by the respective dotted lines 20 and 21.

As is well known, if the voltage applied to the motor armature 15 is adjusted the resultant speed of the motor in turn will be varied or adjusted. In order to adjust the voltage supplied to the motor armature 15, it is merely necessary to change the value of the field excitation of the generator through suitable means.

The means employed in the present invention includes a first control amplifier 22 with the output therefrom connected in series with the generator field 14. A variable reference voltage is applied via conductor represented by line 23 to summation junctions 24 and 25, and then to the input 26 of the first control amplifier 22. The conductor 27 is connected to the output of the tach-generator 19 to conduct feedback to the summation junction 24. A second control amplifier 28 has its output signal fed through a suitable conductor represented by line 29 and applied to the summation junction 25, which supplies the input signal to the amplifier 28. A suitable variable reference is applied to the input of the second control amplifier 28 through a conductor represented by line 31, limiter 32 and summation junction 30. Although the reference is shown in the drawing as being the same source of reference as that supplied to the input of the first control amplifier, it is to be understood that a separate reference source may be used without departing from the scope of the invention. Any suitable means may be employed to vary the reference voltage.

A conductor represented by line 33 is connected to the tachometer output to apply the feedback signal to the junction 30. Indicated in dotted lines at 34 is a limiter which may or may not be used, depending upon the particular environmental use and design of the control system. The second control amplifier 28 has non-linear transfer characteristics with substantially zero output for a negative input and substantially a proportional output for a positive input, as seen in the chart of FIG. 3. In the event the limiter 34 is used to limit the feedback, the limit would accordingly have to be higher than the limit for the reference which is supplied through limiter 32 in order for the input to the amplifier to be negative at high speeds. This is more clearly apparent in FIG. 4, wherein the curve in dotted lines represents the limiter 34 and the solid lines represents the limiter 32.

In operation, at high speeds, the reference exceeds the limiting level of the limiter 32, thereby leaving a negative input to the second control amplifier 28. As described above, the amplifier 28 has a zero output for negative input, and accordingly the excitation system is basically a single stage amplifier system, having sufficient gain to secure satisfactory speed regulation in the higher speed ranges. At lower speed ranges, the reference is below the limit of the limiter 32, supplying a positive input to the second control amplifier 28. The amplifier 28 is active, supplementing the amplifier 22 to provide sufficient gain for excellent regulation at low speeds. As is apparent, the system operates essentially as a two-stage amplifier in the low speed ranges, therefore providing the requisite level of gain to secure excellent speed regulation.

It is to be appreciated that any loading of the motor which would reduce the speed below that preset would result in a diminution of the feedback. Accordingly, the difference in the feedback and the reference results in the amplifier amplifying the algebraic difference to increase the gain to the generator field, which would serve to bring the motor up to a speed at which the feedback signal is practically equal to the reference.

It is contemplated that the amplifier can be any suitable linear amplifier, while either amplifier may be electronic magnetic or rotating so long as they have the necessary characteristics hereinbefore mentioned.

Referring now to FIG. 2, a modified form of the invention is shown, having a prime mover 40 drivingly connected to a generator armature 41. The output of the generator is connected through a suitable conductor represented by line 42 to the armature of the motor 43, the latter driving a load indicated at 44. The generator field 45 is connected to the output of a first control amplifier 46. A suitable reference signal is supplied through the conductor represented by line 47, summation junctions 48 and 49 to the input of the amplifier 46.

Feedback from the armature is supplied through conductor indicated by line 50 to summation junction 48 and then to the amplifier 46. Similarly, feedback is supplied through the conductor represented by line 51 from the motor armature to summation junction 52. Reference voltage is supplied through conductor represented by 53, limiter 54 to the summation junction 52 and the resultant is supplied to the input side of the second control amplifier 55. The output of the second control amplifier 55 is connected to the summation junction 49. The feedback circuit to the second control amplifier may include a limiter 56, if desired, the limiters being set as described in connection with FIG. 1. If desired, a suitable IR compensating circuit may be provided, such circuit being schematically represented at 57. The IR drop compensating circuit may be of any desired form if used; however, it is possible that the circuit 57 may be omitted if design considerations permit.

The operation of the embodiment of FIG. 2 is similar to the operation of FIG. 1. The feedback being employed is dependent upon the well known principle that armature voltage is almost proportional to speed. As explained in connection with FIG. 1, at low speeds there will be a positive input to the second control amplifier 55, thereby resulting in an output signal therefrom. The output of the second control amplifier 55 is supplied to the input of the first control amplifier 46 with the output therefrom exciting the generator field 45.

As was explained in connection with FIG. 1, at high speeds the input to the second control amplifier 45 would be negative and as shown in FIG. 3, with a negative input there is substantially a zero output. However, when the input becomes positive the amplifier becomes active, as described previously. It can thus be seen that excellent gain may be had over wide range of speeds, with sufficient gain at low speeds being available without excessive or more gain than is necessary at high speeds.

It is obvious that variations or modifications may be made in the arrangement herein without departing from the scope of the invention. For example, the generator and its prime mover may be omitted in lieu of a suitable static source of a D.-C. power. Further, the generator may be partly self-excited, or partly excited from the main reference supply. Accordingly, it is intended that any limitations imposed be within the spirit and scope of the appended claims.

I claim:

1. In a motor generator drive arrangement wherein the motor armature circuit is directly connected to the armature circuit of the generator and speed control of the system is achieved by varying the magnitude of the signal applied to the field winding of the generator, a control system providing a control speed variable excitation signal to the generator field winding comprising, a first control amplifier having input and output circuits, said output circuit of said first control amplifier connected to the generator field winding, a second control amplifier having input and output circuits, said output circuit of said second control amplifier connected in circuit with said input circuit of said first control amplifier, reference speed signal means in circuit with each of said amplifiers, and feedback signal means modifying said reference speed signal in accordance with the speed of said motor, whereby at high speeds the second control amplifier will have approximately zero output and accordingly not contributing to the speed control of the motor.

2. The motor generator drive arrangement as defined in claim 1, wherein the feedback signal means modifying said reference signal in accordance with the speed of the motor comprises a tachometer generator developing a signal repsonsive of speed for modifying reference signal supplied to the input of each of said amplifiers.

3. The motor generator drive arrangement as defined in claim 1, wherein limiting means is provided in the input circuit of the second control amplifier.

4. The motor generator drive arrangement of claim 3, wherein said limiting means includes a limiter in the reference signal circuit as well as in the circuit means to modify said reference signal such that the output of said second control amplifier will be substantially zero volts at high motor speeds.

5. The motor generator drive arrangement as defined in claim 1, wherein said feedback signal means modifying said reference signal in accordance with the speed of said motor includes circuit means to feed back the armature voltage to the input of each of said control amplifiers.

6. The motor generator drive arrangement as defined in claim 5, wherein IR drop compensating means are connected in series circuit arrangement between the armature of the generator and the armature of the motor.

7. In a motor generator drive arrangement wherein the motor armature is directly connected to the armature circuit of the generator and speed control of the system is achieved by varying the magnitude of the signal applied to the field winding of the generator, a control system providing a control speed variable excitation signal to the generator field winding comprising, a first control amplifier means having input and output circuits, the output signal developed across said output circuit fed to the field winding of said generator and thereby supplying a variably voltage to said motor, a second control amplifier means having input and output means, the output signal developed by said second control amplifier, supplied to the input of said first control amplifier means, said second control amplifier means having non-linear transfer characteristics with a zero output at high motor speed and a substantially proportional output for a low motor speed, said first control amplifier having a substantially linear transfer function, variable reference signal means yielding an output signal indicative of the desired motor speed of said motor, said reference signal means operatively connected to each of the control amplifier means, and feedback signal means operatively connected to sense the actual speed of said motor and to modify said reference signal to each of said control amplifiers whereby said second control amplifier will have substantially zero output voltage at high speeds.

8. In a motor generator drive arrangement wherein the motor armature circuit is directly connected to the armature circuit of the generator and speed control of the system is achieved by varying the magnitude of the signal applied to the field winding of the generator, a control system providing a control speed variable excitation signal to the generator field winding comprising, a first amplifier operable in response to an excitation signal being applied to its input circuit to provide an amplifier signal at its output, the output circuit of the said first amplifier being in circuit with the said field winding of said generator to result in an excitation thereof, a second amplifier being connected in circuit to the input of said first amplifier, a reference control signal source operable to generate a voltage signal indicative of the desired motor speed, said reference signal source operatively connected in circuit with the input circuit of said first and second amplifiers, motor speed sensing means for detecting the actual speed of the motor at any given time, first signal comparing means operable to compare the actual speed of the motor as sensed by said motor speed sensing means and said desired speed as established by said reference signal source, and generating difference signal proportional thereto, second signal comparing means operable to compare the actual speed of the motor as sensed by said motor speed sensing means and the desired motor speed as established by said reference signal source to develop a signal of a first phase in the event that the actual speed is below the desired speed and of an opposite phase in the event that the actual motor speed is above that established by said reference means, said second amplifier responsive to signals of said first phase from said second comparing means and resulting in an output therefrom, and having a substantially zero volt output signal in response to signals of the opposite phase being applied thereto, the input of said first amplifier being in circuit with and responsive to the cumulative outputs of said second amplifier and said first comparing circuit to result in an appropriate motor speed correcting signal being applied to said field winding of said generator.

References Cited by the Examiner

UNITED STATES PATENTS

| | | |
|---|---|---|
| 2,419,812 | 4/1947 | Bedford. |
| 2,593,950 | 4/1952 | Williams. |
| 2,887,637 | 5/1959 | Nekola _____ 318—31 |
| 2,901,680 | 8/1959 | Goldman _____ 318—28 |
| 2,940,026 | 6/1960 | Raque _____ 318—448 X |
| 3,045,161 | 7/1962 | Hansen et al. _____ 318—145 X |
| 3,109,970 | 11/1963 | Smyth. |

ORIS L. RADER, *Primary Examiner.*